United States Patent
Pfleging et al.

(10) Patent No.: US 7,548,537 B2
(45) Date of Patent: Jun. 16, 2009

(54) 911 LOCATION UPDATING FOR AN ENTERPRISE USING VOIP TELEPHONES

(75) Inventors: Gerald W. Pfleging, Batavia, IL (US); Rachel M. Pfleging, Batavia, IL (US); George P. Wilkin, Bolingbrook, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 827 days.

(21) Appl. No.: 11/119,623

(22) Filed: May 2, 2005

(65) Prior Publication Data

US 2006/0245570 A1 Nov. 2, 2006

(51) Int. Cl.
*H04L 12/66* (2006.01)
*H04M 11/04* (2006.01)

(52) U.S. Cl. .......................... 370/352; 379/37; 379/45; 455/404.2

(58) Field of Classification Search .................. 379/37, 379/40, 45, 49, 389; 340/539.18; 719/213, 719/219, 220; 370/352; 455/404.1, 404.2
See application file for complete search history.

(56) References Cited

U.S. PATENT DOCUMENTS

| | | | |
|---|---|---|---|
| 7,098,787 B2* | 8/2006 | Miller | 340/539.18 |
| 2005/0083911 A1* | 4/2005 | Grabelsky et al. | 370/352 |
| 2005/0197097 A1* | 9/2005 | Mohler | 455/404.2 |
| 2005/0265326 A1* | 12/2005 | Laliberte | 370/389 |

* cited by examiner

*Primary Examiner*—Ahmad F Matar
*Assistant Examiner*—Sonia Gay

(57) ABSTRACT

An exemplary method automatically identifies the location of a voice over Internet protocol (VOIP) telephone relative to the structure of a building upon the VOIP telephone making a 911 call. The identity of the VOIP telephone is transmitted to a database accessible by the VOIP system upon a 911 call origination. Records have been previously created and stored in the database that link each VOIP telephone located in or associated with a building to a text based description of an area of the building. A node instructs the database to find the stored record associated with the VOIP telephone. The identity of the VOIP telephone and the text based location information of the location of the VOIP telephone relative to the structure of the building are transmitted to the 911 call center. This enables a 911 call center operator to immediately discern the location of the 911 caller relative to the structure of the building.

12 Claims, 4 Drawing Sheets

911 LOCATION UPDATING FOR AN ENTERPRISE USING VOIP TELEPHONES

TECHNICAL FIELD

This invention relates generally to voice over Internet protocol (VOIP) and more specifically to providing information about the location of a VOIP telephone user associated with a 911 request for emergency services.

BACKGROUND

Advances in technology continue to provide alternatives for consumers in the telecommunication field. Telephony services provided by VOIP are now relatively commonplace. However, new implementations and capabilities, such as VOIP telephone service as compared with traditional wireline switch based services, also present challenges in providing comparable features and abilities provided by the existing technology. Sometimes the advantages of the new technology may give rise to challenges not faced by the existing technology.

For example, consider a VOIP/IP system that provides telephony services for users in a large office building or in a campus of related buildings. The use of VOIP telephones in such a system provides substantial flexibility in that a telephone can be easily moved to a new location or office within the system just by plugging the telephone in a different VOIP port. This minimizes the administrative and technical support and costs associated with relocating a person or a group from one location within the complex to another location.

However, this gives rise to an increased challenge with regard to providing effective emergency services in response to a 911 call origination. In a traditional wireline telephone system, each telephone was associated with a specific telephone line that was located in a predetermined location. The location of the telephone line/telephone, which did not change without a request being made to the telecommunication provider, could be stored in a database by the telecommunications provider and utilized in conjunction with providing emergency personnel with location information upon the user making a 911 emergency request. Because VOIP telephones are easily transportable at least within the designed system, determining the location of a VOIP telephone user initiating a 911 emergency request call is not as straightforward as it was with wireline telephones. Thus, a need exists for an improved and reliable way of maintaining the specific location of a VOIP telephone, especially one located within a multiple story building, that can be utilized to provide location information for 911 services.

SUMMARY

It is an object of the present invention to address this need.

An exemplary method automatically identifies the location of a voice over Internet protocol (VOIP) telephone relative to the structure of a building upon the VOIP telephone making a 911 call. The identity of the VOIP telephone is transmitted to a database accessible by the VOIP system upon a 911 call origination. Records have been previously created and stored in the database that link each VOIP telephone located in or associated with a building to one of a plurality of text based descriptions of areas of the building. A node instructs the database to find the stored record associated with the VOIP telephone. The identity of the VOIP telephone and the text based location information of the location of the VOIP telephone relative to the structure of the building are transmitted to the 911 call center. This enables a 911 call center operator to immediately discern the location of the 911 caller relative to the structure of the building.

Further implementations of the invention encompass a VOIP system for practicing the method and a node in the VOIP system that is instrumental in obtaining the location information from the database and transmitting it to the 911 call center upon a 911 call origination. Additionally, personnel such as security, fire or medical located in or near the building can be automatically sent a message notifying them upon a 911 call origination.

DESCRIPTION OF THE DRAWINGS

Features of exemplary implementations of the invention will become apparent from the description, the claims, and the accompanying drawings in which:

DETAILED DESCRIPTION

Figure 1:
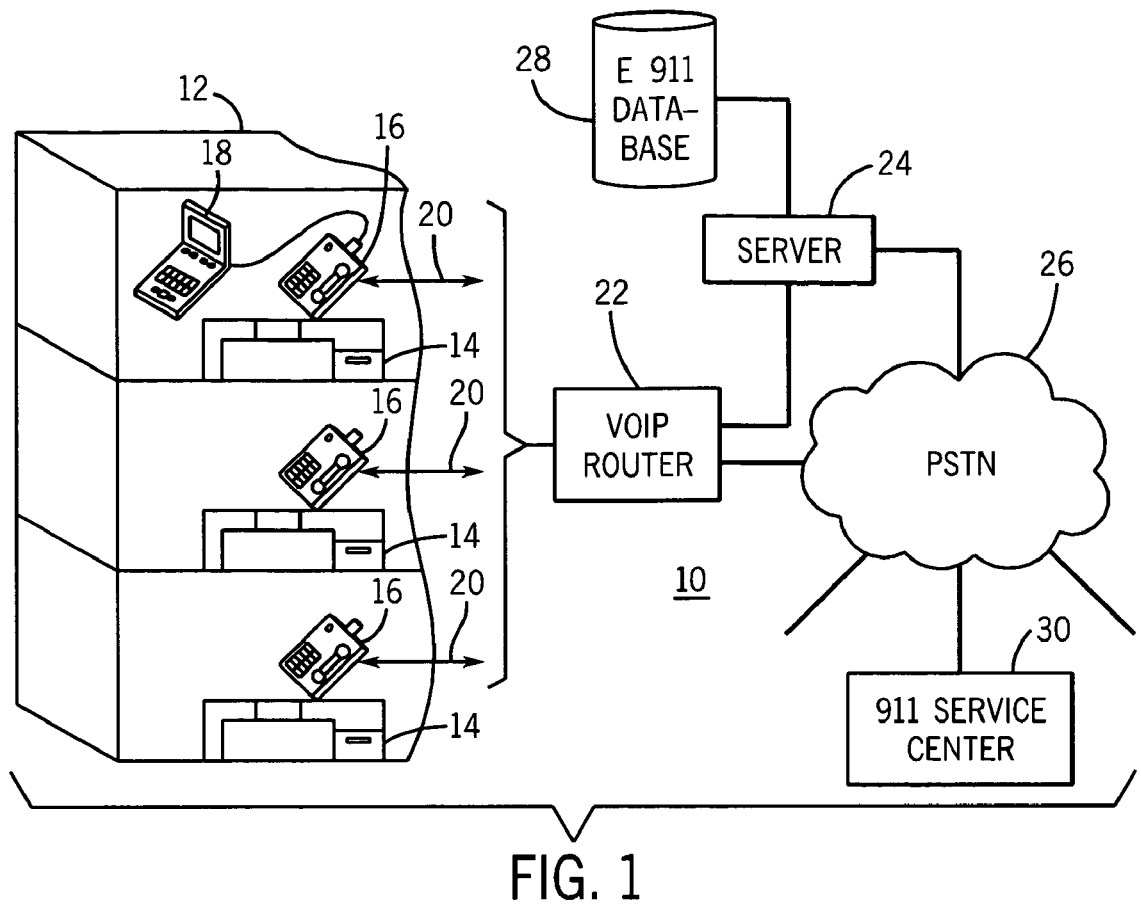
FIG. 1 is a block diagram of the exemplary VOIP telecommunication system in accordance with the present invention.

Referring to FIG. 1, an exemplary VOIP telephony system 10 is utilized to provide telephone services to a plurality of users in a multiple story office building 12. In this example it is assumed that a single business enterprise occupies all of building 12 and hence controls an integrated VOIP telephony system utilized to provide services to all of its employees within the building. Illustrative offices within the multiple stories of the building may contain a desk 14 and a VOIP telephone 16 that preferably includes a data input jack suited for receiving and transmitting data such as with a user's laptop computer 18. Each VOIP telephone is connected by a cable that is ultimately served by a VOIP router 22 that handles the routing of packets received from the VOIP telephones and routing of packets to the destination VOIP telephone. The router 22 is connected to an IP server 24 and to the public switched telephone network (PSTN) 26 that is connected to a plurality of telecommunication devices including a 911 service center 30. The service center 30 is typically a telecommunications center with one or more operators supported by a community for handling requests for emergency services such as directed to police, fire, or medical service units. Typically each operator of a service center is provided with a voice line for communicating with a user making an emergency request and also a data line associated with the voice line for receiving information such as location information that may be displayed on a monitor or a visual location on a map. The server 24 is also connected to an E-911 database 28 that stores a record for each VOIP telephone 16 with the record containing location information or an index to the current location on the VOIP telephone. The determination on the location of each VOIP telephone will be discussed in more detail below.

Figure 2:
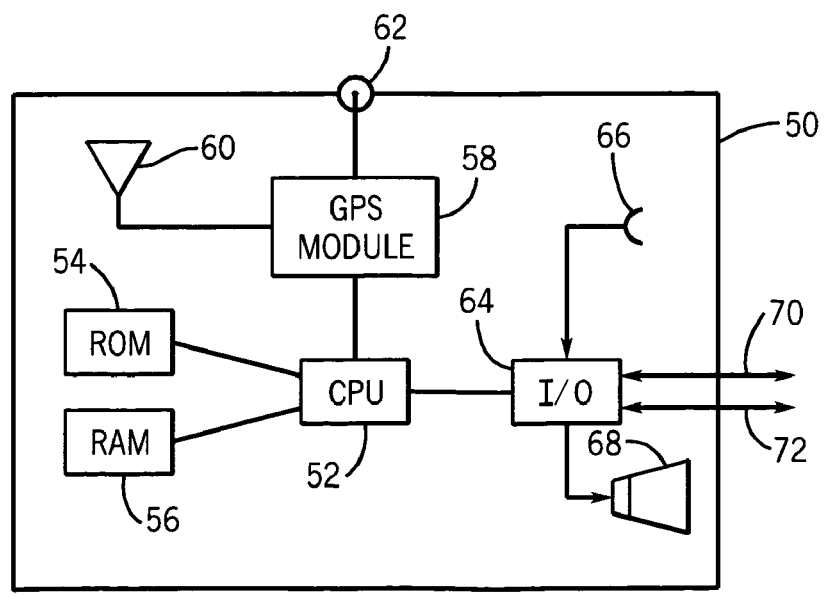
FIG. 2 is a block diagram of an exemplary VOIP telephone in accordance with the present invention.

FIG. 2 is a block diagram of an exemplary VOIP telephone 50 in accordance with an embodiment of the present invention. A central processing unit (CPU) 52 is supported by read-only memory (ROM) 54 and random access memory (RAM) 56. The CPU operates under program instructions initially stored in the ROM. The RAM provides run-time control instructions for the CPU as well as providing for the storage of data an input and output signals. A global positioning satellite system (GPS) module 58 is coupled to the CPU and provides location information consisting of latitude, longitude and altitude. The GPS module needs to receive satellite signals in order to provide the location information. The signals can be acquired by an antenna 60 coupled to the GPS module or from a remote antenna connected to signal input jack 62 coupled to the GPS module. An input/output (I/O) module 64 is coupled to the CPU and facilitates the coupling of external signals to the CPU and transferring of signals from the CPU to other devices or transmission lines. In the illustrative example, a microphone 66 couples a user's voice information to the CPU and a speaker 68 couples output audio information to the user. A transmission line 70 is supported by I/O module 64 and carries packet data between the VOIP telephone 50 and an external node such as VOIP router 22. Also supported by the I/O module 64 is a transmission line 72 that carries data and control information between the VOIP telephone 50 and an external node such as laptop computer 18. Any convenient communication protocol, e.g. Ethernet, could be utilized to convey the information between the VOIP telephone 50 and the computer 18.

Figure 3:
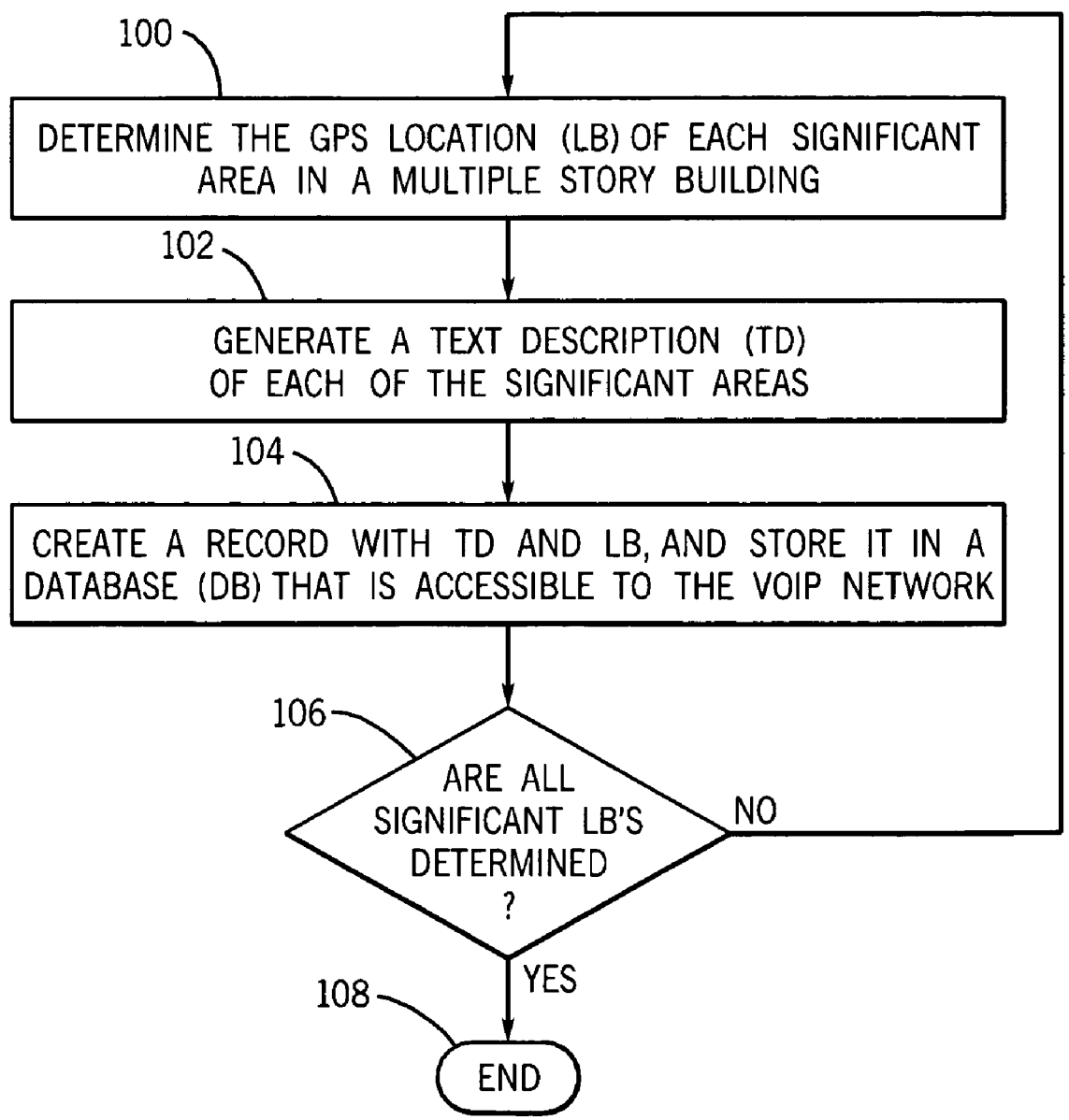
FIG. 3 is a flow diagram of an exemplary method in accordance with the present invention where locations of significant areas within a building are determined and stored.

A general understanding of the exemplary method by which current location information associated with a VOIP telephone is made available in conjunction with emergency 911 call requests from the VOIP telephone will be helpful in understanding the detailed description explained with regard to FIG. 3. The kind of location information normally desired by a 911 service center is a location of the calling party (the calling party's telephone) in terms of street address and if the user is in a multiple story office building, the specific area or office number of the user. The location of the user within a multiple story office building is especially important because the operator at the 911 service center may be required to dispatch different equipment and/or emergency service personnel depending upon the location of the user. For example, the operator may dispatch a conventional fire truck unit if the user is located on the first or second floor of an office building. However, if the user is known to be located on the fifth floor of an office building, the operator may dispatch a special long reach hook and latter fire truck unit in the event of a fire emergency. Thus, having such current location information available is important in order to dispatch in the first instance proper personnel and equipment.

The E-911 database 28 may contain location information about each office or significant area within building 12 as well as the street address of the office building. This location information may be collected by performing a manual walk-through of the building utilizing a laptop computer in association with a GPS receiver. A series of records may be created in which each record identifies the office or significant area of the building along with a corresponding GPS three-dimensional location. This information which is essentially an internal map of the building is stored in the database.

Periodically each VOIP telephone is required to transmit its GPS location to database 28. This could occur at scheduled intervals or be automatically triggered for transmission upon a 911 call being initiated. The GPS location of the VOIP telephone is utilized as an index to scan the database for the closest appropriate GPS location stored in a record that corresponds to a designated office or area of the building. The subject VOIP telephone is then associated with the corresponding record having the same or nearest location. This association can be maintained in a variety of ways. For example, the telephone number associated with the VOIP telephone can be stored in the same record associated with the office/area location, or a new record can be created containing the VOIP telephone number and the corresponding office location and information, e.g. "office on third floor, northwest corner" or "office 312".

FIG. 3 is an exemplary flow diagram explaining how a multiple story building is mapped so that a location is stored for each significant area associated with the building. In the illustrative example, the location of each area is stored as a corresponding latitude, longitude and altitude such as available from a GPS receiver. In step 100 the GPS location (LB) of each significant area in the multiple story building is determined. In step 102 a text description (TD) is generated for each of the significant areas. The GPS locations may be manually determined by a walk-through of the building while utilizing a portable GPS receiver. The text description may also be manually generated by entering an alphanumeric description of the area into a record of a database. The text description can take any form that would be of use to 911 emergency personnel in determining the location of the area in the building. For example, a text description could be: "third-floor office, northwest corner" or "conference room 502" or "southeast corner of interior courtyard". In step 104 a record is created in a database (DB) that is accessible to the VOIP network where the record contains the TD and LB. A determination is made in step 106 of whether all of the significant areas of the building have had a corresponding location determined. A YES determination results in termination of the process at END step 108. A NO determination results in the process continuing by returning to step 100 where locations of additional areas will be determined.

Figure 4:
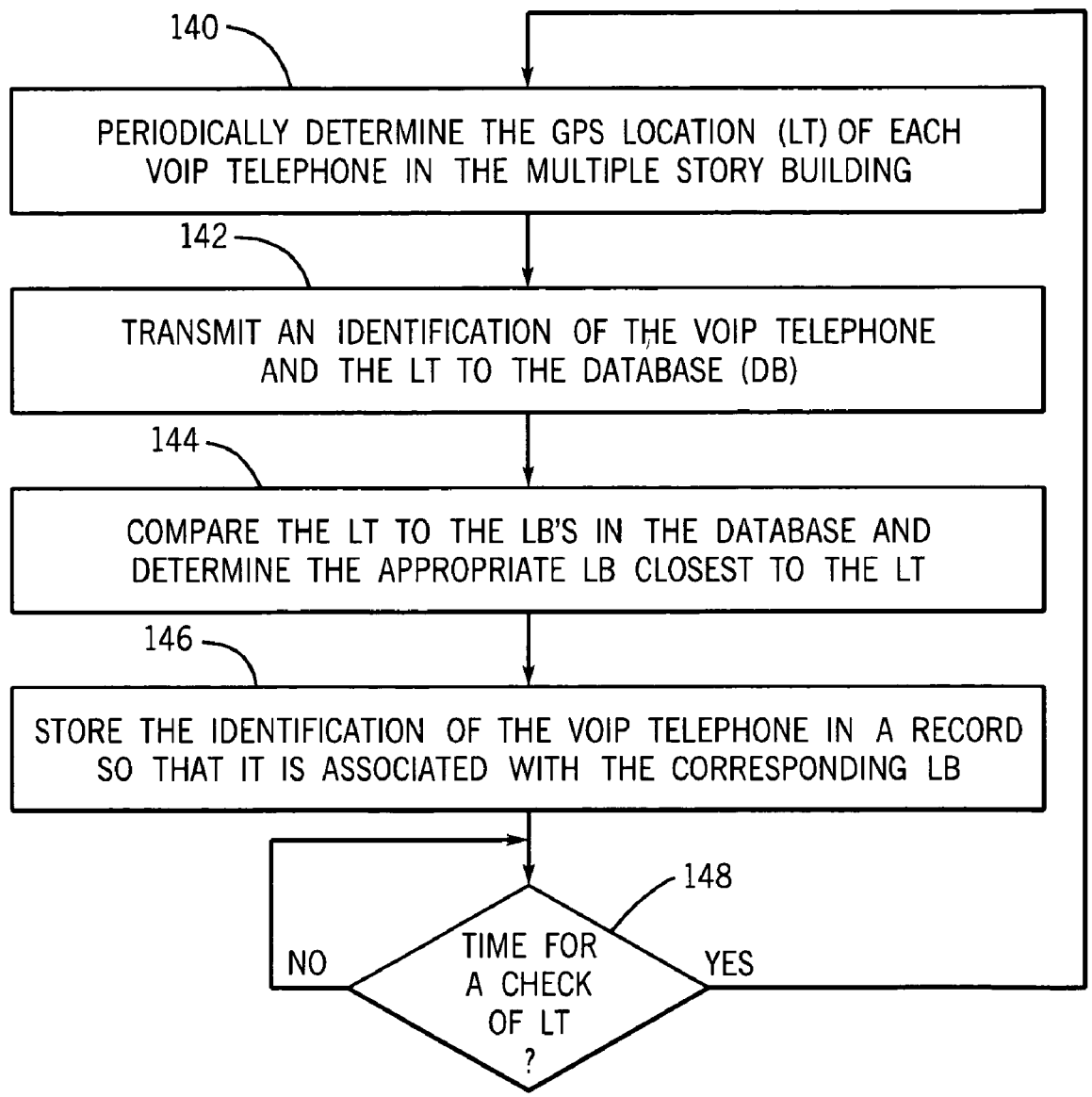
FIG. 4 is a flow diagram of an exemplary method in accordance with the present invention where locations of VOIP telephones within the building are determined and associated with the location of an area in the building.

FIG. 4 is a flow diagram illustrating an exemplary method by which the location of each VOIP telephone associated with the building is identified with a corresponding building location LB. In step 140 the GPS location (LT) of each VOIP telephone associated with the multiple story building is periodically determined. If each VOIP telephone preferably includes a GPS module 58 as shown in FIG. 2, each telephone can be configured to periodically transmit its GPS location LT to the database DB. This may for example be programmed to occur during a time interval when loading of the VOIP network is light such as at 2 a.m. each day. Alternatively, an administrator using a laptop computer and a GPS receiver (which may be built-in to the laptop computer) can physically couple the computer to each VOIP telephone, determine a GPS location, and cause the VOIP telephone to transmit the data to the database DB. This manual collection by the administrator could be accomplished at any periodic interval, e.g. during each Saturday. In step 142 the identification of the VOIP telephone together with the location LT is transmitted to the database DB. In step 144 the database or processing node associated with the database compares the location LT of each VOIP telephone to the stored locations LB in the database. A determination is made on the appropriate location LB closest to the location LT of the VOIP telephone. In step 146 the identification of the VOIP telephone is stored in a record so that it is associated with the corresponding identified location LB. In step 148 a determination is made of whether it is time for a check of the location LT of the VOIP telephones. A NO determination results in the process returning to the beginning of step 148 creating essentially a wait state. A YES determination results in the process returning to the beginning of step 140.

Figure 5:
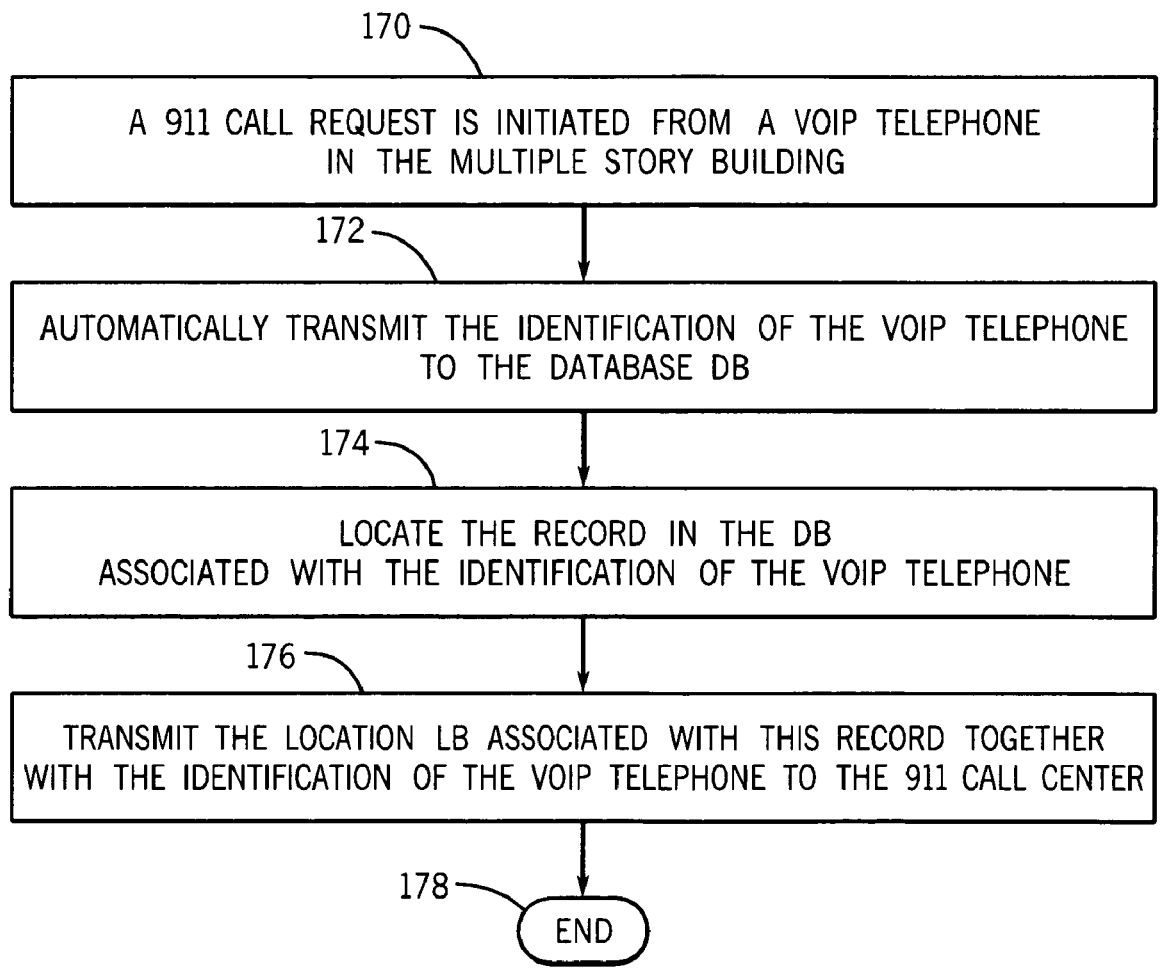
FIG. 5 is a flow diagram of an exemplary method in accordance with the present invention illustrating the communication of location information about a VOIP telephone from which a 911 call request is initiated.

FIG. 5 is a flow diagram of an illustrated embodiment demonstrating how information about the location of a specific VOIP telephone is automatically transmitted to a 911 call center upon a 911 call being initiated from the VOIP telephone. In step 170 a 911 call request is initiated from a VOIP telephone in the multiple story building. In step 172 identification of the VOIP telephone is automatically transmitted to the database DB. The identification of the VOIP telephone may for example consist of its assigned telephone number or other identification code. In step 174 the database or a processing node associated with the database locates the record in the database associated with the identity of the VOIP telephone. In step 176 information from the located record is transmitted to the 911 call center. The information will preferably contain at least the identity of the VOIP telephone and the location LB associated with it. It is preferred that the location LB that is transmitted consist of the text description of the location of the VOIP telephone together with additional information such as the complete street address of the building. Of course, the specific GPS location LB of the VOIP telephone could be transmitted in addition to, or in place of, the text information depending upon the needs of the switching and location equipment used by the 911 call center. The transmission of this location information may be associated with, i.e. linked to, the corresponding voice call being simultaneously generated by the initiation of the 911 call from the VOIP telephone.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made. For example, the VOIP router 22 or server 24 could function as the node by which the building locations are initially mapped and stored within the database. This node can also serve as the intelligent query element that retrieves the corresponding text based description of the location of the VOIP telephone upon a 911 call origination. It is of course possible for the intelligence associated with this node to be embedded in various network elements. Even the 911 service center could function as such a node and generate queries upon the receipt of a 911 call based on the identification of the VOIP telephone.

Similarly, the database itself could be integrated within another network element. Although the identity of a VOIP telephone must be linked to the text based location information stored in the database, this can be accomplished in different ways. For example, the identity of a VOIP telephone can be stored in the record that contains the text based location information or a pointer or list index could be utilized to establish the correspondence between the VOIP telephone identity and the text based location information.

In selecting the closest "appropriate" location of an area mapped within the building with which to associate the location of a particular VOIP telephone, it will be beneficial to consider factors that will be useful to emergency personnel. For example, the appropriate closest location should be selected to be on the same level or floor of the building as the VOIP telephone even if a physically closer area exists on a different floor. Although GPS location information is envisioned, other ways of identifying a three-dimensional location could be used. Personnel such as security, fire or medical located in or near the building can be automatically notified upon a 911 call origination. The identity of such personnel can be stored in the database and can be sent a message based on which personnel are closest to the VOIP telephone making the 911 call origination. This action is in addition to the normal routing of the call to 911. Further such personnel can be conferenced in a full duplex mode or listen only mode to the 911 call itself either at the VOIP router or PSTN switch serving the 911 call center.

The scope of the invention is defined by the following claims.

We claim:

1. A method implemented by a voice over Internet protocol (VOIP) system comprising the steps of:
generating first information about a first location of a first VOIP telephone, where the first information includes three dimensional geographic coordinates of the first VOIP telephone;
transmitting said first information and information identifying the associated VOIP telephone to a database accessible by the VOIP system;
storing a plurality of records in the database where each record includes a location of a corresponding area of a building where each area is limited to being only on one floor of the building and is defined by corresponding three dimensional geographic coordinates, each record containing a text description of the area of the building including the floor of the building containing the area, the first information not containing location information related to the floor of the building;
assigning the first VOIP telephone at the first location to a first record based on the floor of the building on which the first VOIP telephone resides being on the same floor as the area of the first record and the proximity of the first location to the area of the first record;
comparing a current location of the first VOIP telephone with locations stored in records in the database;
determining a second record with its corresponding area location closest to the current location of the first VOIP telephone on the same floor as contained in the first record;
linking the identifying information of the VOIP telephone with the second record, so that the text description of the location associated with the first VOIP telephone can be identified and retrieved for use during a 911 call request by the first VOIP telephone from the second record.

2. The method of claim 1 further comprising the step of:
initiating a 911 call from the first VOIP telephone;
automatically generating and transmitting a query to the database in response to the 911 call initiation from the first VOIP telephone;
identifying in the database the second record and the corresponding text description linked to the first VOIP telephone;
transmitting a message to a 911 call destination containing the identity of the first VOIP telephone and at least the text description.

3. The method of claim 1 wherein the step of generating first information about the location of a VOIP telephone comprises generating the first information by a VOIP telephone that is adapted to acquire global positioning satellite (GPS) information of the location of the VOIP telephone.

4. The method of claim 3 wherein the VOIP telephone contains a GPS module that acquires the GPS information.

5. The method of claim 1 further comprising the steps of:
  storing in the database identification of telecommunication numbers of local personnel located at the building;
  automatically sending a message to the telecommunication numbers upon the origination of a 911 call from a VOIP telephone, the message alerting the local personnel of the origination of a 911 call.

6. The method of claim 5 further comprising the step of conferencing the local personnel onto the voice channel carrying the 911 call origination.

7. A voice over Internet protocol (VOIP) system comprising:
  means for generating first information about a first location of a first VOIP telephone, where the first information includes three dimensional geographic coordinates of the first VOIP telephone;
  means for transmitting said first information and information identifying the associated VOIP telephone to a database accessible by the VOIP system;
  means for storing a plurality of records in the database where each record includes a location of a corresponding area of a building where each area is limited to being only on one floor of the building and defined by corresponding three dimensional geographic coordinates, each record containing a text description of the area of the building including the floor of the building containing the area, the first information not containing location information related to the floor of the building;
  means for assigning the first VOIP telephone at the first location to a first record based on the floor of the building on which the first VOIP telephone resides being on the same floor as the area of the first record and the proximity of the first location to the area of the first record;
  means for comparing current location of the first VOIP telephone with locations stored in records in the database;
  means for determining a second record with its corresponding area location closes to the current location of the first VOIP telephone on the same floor as contained in the first record;
  means for linking the identifying information of the VOIP telephone with the second record, so that the text description of the location associated with the first VOIP telephone can be identified and retrieved for use during a 911 call request by the first VOIP telephone from the second record.

8. The system of claim 7 further comprising:
  means for initiating a 911 call froni thea first VOIP telephone;
  means for automatically generating and transmitting a query to the database in response to the 911 call initiation from the first VOIP telephone;
  means for identifying the second record and the corresponding text description linked to the first VOIP telephone;
  means for transmitting a message to a 911 call destination containing the identity of the first VOIP telephone and at least the text description.

9. The system of claim 7 wherein the means for generating first information about the location of a VOIP telephone comprises means for generating the first information by a VOIP telephone that is adapted to acquire global positioning satellite (GPS) information of the location of the VOIP telephone.

10. The system of claim 9 wherein the VOIP telephone contains a GPS module that acquires the GPS information.

11. The system of claim 7 further comprising:
  means for storing in the database identification of telecommunication numbers of local personnel located at the building;
  means for automatically sending a message to the telecommunication numbers upon the origination of a 911 call from a VOIP telephone, the message alerting the local personnel of the origination of a 911 call.

12. The system of claim 11 further comprising means for causing the conferencing the local personnel onto the voice channel carrying the 911 call origination.

\* \* \* \* \*